Sept. 24, 1935.  S. PENNELL  2,015,123
BLOOD TRANSFUSION APPARATUS
Filed May 11, 1934
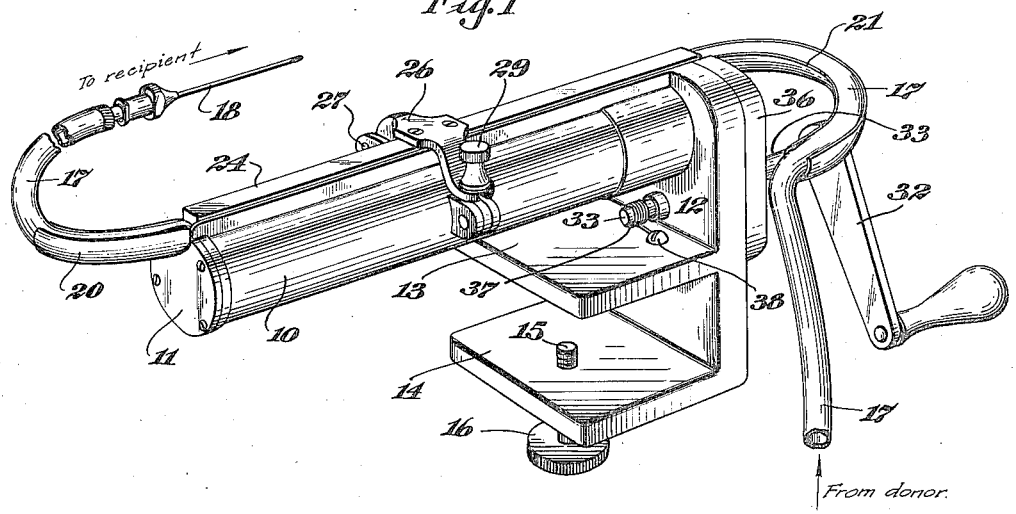
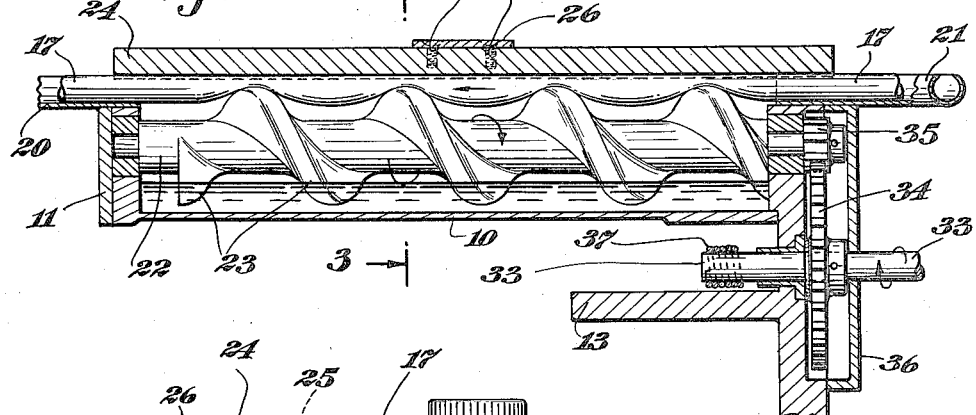
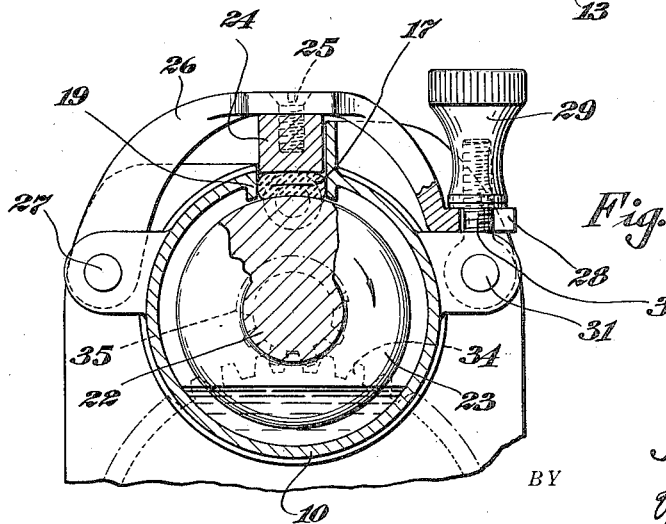
INVENTOR
Samuel Pennell,
BY
Frederick Breitenfeld
ATTORNEY Patented Sept. 24, 1935

2,015,123

UNITED STATES PATENT OFFICE 2,015,123

BLOOD TRANSFUSION APPARATUS

Samuel Pennell, New York, N. Y.

Application May 11, 1934, Serial No. 725,067

14 Claims. (Cl. 103—149)

My present invention relates generally to surgery, and has particular reference to a blood transfusion apparatus.

The conventional mechanism for effecting a blood transfusion from a donor to a recipient consists essentially of a syringe comprising a barrel and plunger, together with tubes or conduits extending, respectively, to the donor and recipient. Valves are provided, either in the conduits or in conjunction with the syringe, for permitting predetermined quantities of blood to be transferred, step by step.

The shortcomings of this type of device need hardly be elaborated upon. Not only are the elements difficult to sterilize and to keep in clean and unclogged condition, but the syringe is commonly made of glass and is, therefore, breakable. One of the principal disadvantages lies in the fact that the transfusion must be accomplished in a step-by-step manner involving periodic conditions of stasis in the conduits and in the syringe, a condition which is highly undesirable because of the rapid tendency toward coagulation and clogging.

The present invention provides an apparatus of radically different characteristics and mode of operation, having recourse to the novel mode of functioning illustrated in Patent Number 1,874,667. Briefly, this mode of operation resides in producing a peristaltic movement in a flexible tube of rubber or the like, whereby a continuous and uninterrupted flow of blood through the tube may be effected.

Many considerable practical difficulties are encountered in endeavoring to produce such a peristaltic movement by means of a rotating worm. Direct contact between the worm and the tube has a tendency to move the tube bodily in a longitudinal direction and laterally in the direction of rotation of the worm. On the other hand, the interposition of a suitable transmitting medium, such as the pivoted strips of the aforementioned patent gives rise to even greater difficulties of friction, lubrication and alignment.

It is a general object of my present invention to provide an apparatus which is entirely practical; which may be feasibly and economically manufactured; and which is of extreme simplicity in construction and manner of use.

One of the features of my invention lies in an arrangement which permits a worm or screw to be rotated in direct contact with a tube through which the blood is to be passed. I have found that by properly providing for a means for continuously lubricating the tube surface with which the worm contacts many of the difficulties heretofore encountered and heretofore precluding the provision of an entirely practical device may be overcome.

Accordingly it is a more specific feature of my invention to provide an apparatus in which the worm is accommodated within a casing adapted to contain a lubricant and in which an efficient and simple means is provided for holding the tube in direct contact with the worm in a manner whereby the lubricant is continuously fed to the surface with which the worm contacts.

Another feature of my invention lies in providing an arrangement which affords proper lateral support to the tube thereby preventing the rotation of the worm from shifting the tube out of its proper position.

A still further feature of the invention lies in providing an arrangement which counteracts any tendency of the tube toward bodily longitudinal movement.

I achieve the foregoing objects and such other objects as may hereinafter appear or be pointed out in the manner illustratively exemplified in the accompanying drawing wherein—

Figure 1 is a perspective view of an apparatus embodying the features of my present invention;

Figure 2 is a longitudinal cross-section with parts broken away for the sake of clearness; and Figure 3 is an enlarged cross-sectional view taken substantially along the line 3—3 of Figure 2.

A casing 10 of substantially cylindrical character is closed at one end by the end plate 11 and is secured at the opposite end to a bracket 12. This bracket may be of any suitable character to permit the apparatus to be removably attached to a table or other fixed support and I have illustratively shown the bracket provided with two superposed arms 13 and 14 the lower one being provided with the clamping stud 15 controllable by rotating the knob 16.

The casing 10 is adapted to contain a lubricant such as glycerine, but it is not necessary that the lubricant fill the entire casing. A substantial quantity of it in the bottom of the casing is generally sufficient.

The only portion of the apparatus with which the blood comes in contact is the flexible rubber tube or conduit 17 which is provided at its opposite ends with suitable hypodermic needles of the character ordinarily used in blood transfusion operations. I have illustratively shown at 18 the needle that would be injected into the recipient.

Along the top of the casing 10 I provide a longitudinal channel 19 adapted to accommodate the tube 17. At the outlet end of the apparatus this channel merges and communicates with the projecting guide 20; and at the inlet end of the apparatus the channel merges and communicates with a similar guide 21, except that the latter guide, for a purpose presently to be described, is of substantial curvature, conforming almost to a complete semicircle.

Within the casing 10 there is journaled the worm shaft 22, this shaft being provided with the convoluted rib 23 having rounded exterior edges and of substantial pitch. It will be understood that the term "worm", as used herein and in the appended claims, is intended to refer to the entire rotatable member and, more especially, to the convolutions 23.

The worm is journaled longitudinally, so that it is disposed within the casing parallel to the channel 19 and directly underneath the latter. The walls of the channel extend downwardly into the casing as far as possible without making actual contact with the worm, so that when the tube 17 is laid into the channel it will rest directly upon the exposed upper portion of the worm.

In order to provide a means for pressing the tube firmly into direct contact with the worm, I provide a pressure bar 24 which is adapted to be snugly inserted into the channel 19, over the tube 17. This bar is preferably hinged to the casing, and I have illustratively shown the bar connected, as at 25, to the top of a curved arm 26 which is hinged to the casing as at 27. The opposite end of the arm 26 is provided with a slot 28 which is brought into cooperative relation to a clamping nut 29 when the apparatus is used. The nut 29 is adjustably threaded onto a stud 30, which is hinged, as at 31, to the casing 10. By engaging the stud 30 within the slot 28 and then tightening the nut 29, the bar 24 is firmly clamped downwardly into the channel 19; and when the tube 17 is disposed beneath it, this clamping action presses the tube firmly into direct contact with the worm. This results in compressing the tube 17 at spaced portions, as indicated in Figure 2. The rotation of the worm may be accomplished by any desired means, but I prefer to employ a crank handle 32 which controls the rotation of a spindle 33. This spindle carries a relatively large gear 34 which meshes with a smaller gear 35, the latter being mounted on the end of the worm. The gears 34 and 35 are preferably accommodated within a gear housing 36.

To prevent a reverse rotation of the worm I provide what may be termed a "ratchet" device in association with the transmission between the crank handle 32 and the worm. In the illustrated embodiment I have illustrated a construction in which recourse is had to the well known tendency of a spiral spring to contract and grip around a shaft when the shaft rotates in the direction which tends to wind up the spring. A coiled spring 37 is secured to the bracket 12, as at 38, and is snugly encircled about the inner projecting end of the spindle 33. When the spindle 33 rotates in the direction of the arrow of Figure 2, the spring 37 tends to unwind, thereby permitting free rotation of the spindle 33. This produces a rotation of the worm in the direction indicated by the arrow of Figure 2. Any attempt to rotate the spindle 33 in the reverse direction is immediately prevented by the tendency of the spring 37 to wind up, whereby the spring clamps itself firmly about the spindle 33 and locks it against the undesired reverse rotation.

The mode of operation will be clear from the description of the apparatus. The tube 17 is first filled with a liquid, such as a saline solution; and after the flow of blood from the donor has been established, the outlet end of the tube is connected with the recipient. By slowly rotating the crank handle 32, the frictional contact of the rotating worm against the under-surface of the tube 17 will produce a peristaltic movement in the tube, whereby a continuous flow of blood through the tube, in the desired direction, is set up. There are no periods of stasis; the rapidity of flow can be accurately controlled; and the exact amount can be readily determined by calibration, i. e., by determining beforehand the amount of blood which is transmitted during each rotation of the crank handle 32.

The production of a peristaltic movement in the tube is not new per se, but, whereas previous attempts to harness this mode of operation to practical use have been unsuccessful, the present apparatus provides an entirely practical and feasible instrument. The disposition of the worm within the present casing, so that the lower portion of the worm is immersed in a lubricant, provides for a continuous lubrication of the under-surface of the tube 17. Any necessity for intermediate mechanism between the worm and the tube is, therefore, eliminated. Lateral dislocation of the tube is prevented by the accommodation of the tube within the channel 19, and a firm engagement between the tube and worm is constantly maintained by the operation of the pressure bar 24.

Any tendency of the tube to move bodily in a longitudinal direction under the impetus of the rotating worm is not only minimized by the continuous lubrication, but is counteracted by the curvature of the guide 21. By imparting this curvature to the tube at the inlet end of the apparatus a sort of "snubbing" action is effected. It will be understood, however, that any other suitable engagement means may be provided for, if desired, to accomplish this objective.

All of the parts of the present apparatus, except the tube, are preferably made of metal, such as chromium-plated or nickel-plated steel or iron. The journals of the worm are preferably mounted in anti-friction bearings or bushings. The complete apparatus is thus of finished and workmanlike appearance, easy to maintain in clean and sanitary condition; and the fact that the blood comes in contact only with the interior of the rubber tube provides for ready sterilization, or inexpensive replacement of the entire tube.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In a blood transfusion apparatus, a rubber tube through which the blood is to be fed from a donor to a recipient, a worm arranged in parallel relation alongside of the tube, means for pressing the tube into direct contact with the worm, means for rotating the worm to impart a peristaltic movement to the tube, and means for continuously lubricating the tube surface with which the worm contacts.

2. In a blood transfusion apparatus, a rubber tube through which the blood is to be fed from a donor to a recipient, a worm arranged in parallel relation alongside of the tube, means for pressing the tube into direct contact with the worm, means for rotating the worm to impart a peristaltic movement to the tube, and means for continuously lubricating the tube surface with which the worm contacts, said last-named means comprising a casing containing a lubricant, the casing being arranged beneath the worm in a manner whereby the worm is partially immersed in the lubricant.

3. In a blood transfusion apparatus, a rubber tube through which the blood is to be fed from a donor to a recipient, a substantially horizontal casing containing a lubricant, a worm in the casing and at least partially immersed in said lubricant, means for pressing the tube into direct contact with the exposed portion of the worm and in parallel relation thereto, and means for rotating the worm to impart a peristaltic movement to the tube, the tube surface with which the worm contacts being continuously lubricated by the lubricant that is picked up by the worm during said rotation.

4. In a blood transfusion apparatus, a rubber tube through which the blood is to be fed from a donor to a recipient, a substantially horizontal casing adapted to contain a lubricant, the top of the casing being provided with a channel adapted to accommodate said tube, a worm arranged in the casing parallel to and underneath said channel, the worm having its lower portion immersed in said lubricant, means for pressing the tube downwardly into direct contact with the worm, and means for rotating the worm to impart a peristaltic movement to the tube.

5. In a blood transfusion apparatus, a rubber tube through which the blood is to be fed from a donor to a recipient, a substantially horizontal casing adapted to contain a lubricant, the top of the casing being provided with a channel adapted to accommodate said tube, a worm arranged in the casing parallel to and underneath said channel, the worm having its lower portion immersed in said lubricant, means for pressing the tube downwardly into direct contact with the worm, means for rotating the worm to impart a peristaltic movement to the tube, and means for preventing reverse rotation of said worm.

6. In a blood transfusion apparatus, a rubber tube through which the blood is to be fed from a donor to a recipient, a substantially horizontal casing adapted to contain a lubricant, the top of the casing being provided with a channel adapted to accommodate said tube, a worm arranged in the casing parallel to and underneath said channel, the worm having its lower portion immersed in said lubricant, means for pressing the tube downwardly into direct contact with the worm, means for rotating the worm to impart a peristaltic movement to the tube, said means comprising a crank handle and a transmission between the handle and worm, and means associated with said transmission for preventing reverse rotation of the worm.

7. In a blood transfusion apparatus, a rubber tube through which the blood is to be fed from a donor to a recipient, a substantially horizontal casing provided on the top with a channel adapted to accommodate said tube, a worm journaled in the casing beneath the channel and parallel to the latter, means for pressing the tube downwardly into direct contact with the worm, and means for rotating the worm to impart a peristaltic movement to the tube.

8. In a blood transfusion apparatus, a rubber tube through which the blood is to be fed from a donor to a recipient, a substantially horizontal casing provided on the top with a channel adapted to accommodate said tube, a worm journaled in the casing beneath the channel and parallel to the latter, a pressure bar insertable into the channel above the tube for pressing the latter into direct contact with the worm, and means for rotating the worm to impart a peristaltic movement to the tube.

9. In a blood transfusion apparatus, a rubber tube through which the blood is to be fed from a donor to a recipient, a substantially horizontal casing provided on the top with a chnnel adapted to accommodate said tube, a worm journaled in the casing beneath the channel and parallel to the latter, a pressure bar hinged to the casing and adapted to be swung into and out of the channel, said bar serving to press the tube downwardly against the worm, and means for rotating the worm to impart a peristaltic movement to the tube.

10. In a blood transfusion apparatus, a rubber tube through which the blood is to be fed from a donor to a recipient, a substantially horizontal casing provided on the top with a channel adapted to accommodate said tube, a worm journaled in the casing beneath the channel and parallel to the latter, a pressure bar insertable into the channel above the tube, means for clamping the bar downwardly so as to press the tube against the worm, and means for rotating the worm to impart a peristaltic movement to the tube.

11. In a blood transfusion apparatus, a rubber tube through which the blood is to be fed from a donor to a recipient, a worm arranged in parallel relation alongside of the tube, means for pressing the tube into direct contact with the worm, means for rotating the worm to impart a peristaltic movement to the tube, and means engaging the tube on the inlet side of the apparatus to counteract any tendency toward bodily longitudinal movement of the tube.

12. In a blood transfusion apparatus, a rubber tube through which the blood is to be fed from a donor to a recipient, a worm arranged in parallel relation alongside of the tube, means for pressing the tube into direct contact with the worm, means for rotating the worm to impart a peristaltic movement to the tube, and means engaging the tube on the inlet side of the apparatus and imparting to the tube a curvature which counteracts by a snubbing action any tendency toward bodily longitudinal movement of the tube.

13. In a blood transfusion apparatus, a rubber tube through which the blood is to be fed from a donor to a recipient, a worm arranged in parallel relation alongside of the tube, means for pressing the tube into direct contact with the worm, means for rotating the worm to impart a peristaltic movement to the tube, and a curved guide snugly accommodating the tube on the inlet side of the apparatus to counteract by a snubbing action any tendency toward bodily longitudinal movement of the tube.

14. In a blood transfusion apparatus, a rubber downwardly into direct contact with the worm, tube through which the blood is to be fed from a donor to a recipient, means for supporting the tube in a substantially horizontal position, a horizontal worm arranged beneath the tube and parallel thereto, means for pressing the tube means for rotating the worm to impart a peristaltic movement to the tube, and means for supporting the tube laterally to prevent the worm rotation from shifting the tube out of position.

SAMUEL PENNELL.